United States Patent
Chen et al.

(10) Patent No.: US 12,557,127 B2
(45) Date of Patent: Feb. 17, 2026

(54) METHOD, AND ELECTRONIC DEVICE FOR ALLOCATING ROUTING RESOURCES OF WIFI6 ROUTER

(71) Applicant: MICRONET UNION TECHNOLOGY (CHENGDU) CO., LTD., Chengdu (CN)

(72) Inventors: Tao Chen, Chengdu (CN); Caixia Wei, Chengdu (CN); Leilei Xi, Chengdu (CN); Zhiwei Kang, Chengdu (CN); Xinyun Guan, Chengdu (CN)

(73) Assignee: MICRONET UNION TECHNOLOGY (CHENGDU) CO., LTD., Chengdu (CN)

(*) Notice: Subject to any disclaimer, the term of this patent is extended or adjusted under 35 U.S.C. 154(b) by 260 days.

(21) Appl. No.: 18/336,032

(22) Filed: Jun. 16, 2023

(65) Prior Publication Data

US 2023/0337266 A1    Oct. 19, 2023

Related U.S. Application Data

(63) Continuation of application No. PCT/CN2021/135037, filed on Dec. 2, 2021.

(30) Foreign Application Priority Data

Dec. 17, 2020  (CN) .......................... 202011502753.4

(51) Int. Cl.
*H04W 72/04* (2023.01)
*H04W 72/52* (2023.01)
*H04W 84/12* (2009.01)

(52) U.S. Cl.
CPC ........... *H04W 72/52* (2023.01); *H04W 72/04* (2013.01); *H04W 84/12* (2013.01)

(58) Field of Classification Search
None
See application file for complete search history.

(56) References Cited

U.S. PATENT DOCUMENTS

| 2019/0207856 A1 | 7/2019 | Guck |
| 2022/0141825 A1* | 5/2022 | Malladi .................. H04W 36/20 |
| | | 370/235 |

FOREIGN PATENT DOCUMENTS

| CN | 105373434 A | 3/2016 |
| CN | 108566286 A | 9/2018 |

(Continued)

OTHER PUBLICATIONS

International Search Report issued in corresponding International application No. PCT/CN2021/135037, mailed Jan. 26, 2022 (7 pages).

(Continued)

*Primary Examiner* — Gary Lafontant (57) ABSTRACT

A method and an electronic device for allocating routing resources of a WIFI6 router are provided. The method includes determining an application resource configuration strategy and transmitting the application resource configuration strategy to the WIFI6 router; transmitting an application start notification to the WIFI6 router; creating a task queue by querying the application resource configuration strategy according to the target application in the application start notification, and configuring fixed routing resources for the task queue by the WIFI6 router; detecting effect of application data processing on the routing resources and optimizing the routing resource configuration according to the effect; and transmitting an application stop notification to the WIFI6 router by the client device when an application shutdown operation is detected, receiving the application (Continued)

stop notification and releasing the fixed routing resources by disbanding the task queue by the WIFI6 router.

10 Claims, 4 Drawing Sheets

(56) References Cited

FOREIGN PATENT DOCUMENTS

| | | |
|---|---|---|
| CN | 109792411 A | 5/2019 |
| CN | 109842522 A | 6/2019 |
| CN | 110213363 A | 9/2019 |
| CN | 112637871 A | 4/2021 |

OTHER PUBLICATIONS

Written Opinion of the International Searching Authority for No. PCT/CN2021/135037, mailed Jan. 26, 2022 (14 pages).
CNIPA, Office Action issued for Chinese Application No. 202011502753.4, mailed Jun. 1, 2021 (10 pages).

\* cited by examiner

METHOD, AND ELECTRONIC DEVICE FOR ALLOCATING ROUTING RESOURCES OF WIFI6 ROUTER

CROSS-REFERENCE TO RELATED APPLICATIONS

This present disclosure claims priority to Chinese Patent Application No. 202011502753.4 filed on Dec. 17, 2020, with a title of "method and electronic device for allocating routing resources of WIFI6 router", the contents of which are incorporated by reference herein.

FIELD

The present disclosure generally relates to a field of communication, and particularly to a method and an electronic device for allocating routing resources of a WIFI6 router.

BACKGROUND

With development of Internet and popularization of wireless terminal devices, as a low-cost, conveniently configured wireless network access device, wireless routers are quickly applied to household. With improvement of network speed and popularity of high flow consumption products under a condition of network development, which provides higher requirements for wireless routing equipment.

In order to meet requirements of a large number of users, IEEE802.11 Standards Committee has formulated a 802.11axWLAN standard protocol, through an Orthogonal Frequency Division Multiple Access (OFDMA) technology, an ability of multiple users to access network in parallel is improved, which effectively reduces a conflict probability and agreement overhead between network users, and effectively improves throughput of the network.

SUMMARY

In a first aspect, the present disclosure provides a method for allocating routing resources of a WIFI6 router, the method includes:
determining an application resource configuration strategy according to features of a target application and transmitting the application resource configuration strategy to the WIFI6 router by a client device;
transmitting an application start notification to the WIFI6 router;
querying the application resource configuration strategy according to the application start notification, creating a task queue, and configuring fixed routing resources for the task queue by the WIFI6 router;
transmitting and receiving peak load test data through the WIFI6 router by the client device, obtaining performance parameters for executing the peak load test data from the WIFI6 router; determining whether the performance parameters meet requirements of the application resource configuration strategy; if the performance parameters meet the requirements of the application resource configuration strategy, executing the application resource configuration strategy according to the task queue and the fixed routing resources; if the performance parameters do not meet the requirements of the application resource configuration strategy, providing optimized parameters according to differences between the performance parameters and the requirements of the application resource configuration strategy, and optimizing the task queue and the fixed routing resources by the optimized parameters until the requirements of the application resource configuration strategy is met; and
transmitting an application stop notification to the WIFI6 router by the client device when an application deactivation operation is detected, receiving the application stop notification and releasing the fixed routing resources by disbanding the task queue by the WIFI6 router.

In some embodiments, the WIFI6 router includes a configuration table storing the application resource configuration strategy, and the configuration table records a MAC and an IP of the client device where the target application is installed, a target application ID of the target application, and related resource configuration parameters; the application start notification includes the MAC, the IP, and the target application ID of the client device where the application is installed, the WIFI6 router creates the task queue by retrieving the configuration table according to the application start notification and obtaining related resource configuration parameters.

In some embodiments, the method further includes: adding an identification code corresponding to the target application ID to a header of a data packet of the target application; and
parsing the header of the data packet, obtaining the MAC, the IP, and the identification code, and adding the data packet to the task queue according to the MAC, the IP, and the identification code by the WIFI6 router.

In some embodiments, the method further includes: creating two hash slots for generating tokens, wherein a token generation rate of the hash slots is determined according to the resource configuration parameters, a first one of the hash slots generates the tokens according to an average rate of data of the target application and stores the tokens in a first token queue, and a second one of the hash slots generates the tokens according to a peak rate of the data of the target application and stores the tokens in a second token queue;
creating the task queue corresponding to the application, and transmitting data related to the target application to the task queue according to the identification code by the WIFI6 router; and
obtaining the tokens from the first token queue and the second token queue, extracting the data related to the target application from the task queue according to the tokens, and transmitting the data related to the target application to the fixed routing resources; processing and forwarding the data related to the target application by the fixed routing resources.

In some embodiments, the routing resources include data processing thread resources for data in the task queue, the data processing thread resources call a packet transmitting function to process the data in the task queue.

In some embodiments, the method further includes: configuring a data processing thread pool for the task queue, wherein the data processing thread pool includes core threads and non-core threads, the core threads permanently exist in the data processing thread pool for processing the data in the task queue, the non-core threads are temporarily created for processing the data in the task queue, and the non-core threads are destroyed in response that an idle time of the non-core threads exceeds a predetermined time threshold.

In some embodiments, a step of obtaining the performance parameters for executing the peak load test data includes:

obtaining the performance parameters for executing the peak load test data by capturing packets, wherein the performance parameters comprise a data transmission rate, a delay rate, and a packet loss rate.

In some embodiments, the optimized parameters comprise a change rate of each of the hash slots, an optimization of a task queue capacity, an optimization of a thread capacity of the data processing thread pool, an optimization of a number of the core threads in the data processing thread pool, an optimization of a capacity threshold, and an optimization of a time threshold of the non-core threads.

In some embodiments, a configuration threshold of the task queue is determined according to a thread capability of the WIFI6 router.

In a second aspect, the present disclosure provides an electronic device for allocating routing resources of a WIFI6 router. The electronic device includes a client device and a WIFI6 router. The client device is configured with at least one client instruction, and the at least one client instruction is executed to cause the client device to provide an application resource configuration strategy customization interface for determining and optimizing an application resource configuration strategy, detecting startup statuses of a target application, and transmitting an application start notification and an application stop notification.

The WIFI6 router is configured with at least one routing instruction, and the at least one routing instruction is configured to execute a method for allocating routing resources of the WIFI6 router.

In some embodiments, according to the method provided by the embodiments of the present disclosure, when the client device runs the target application with the application resource configuration strategy, the client device transmits the application start notification to the WIFI6 router, and the WIFI6 router allocates the fixed routing resources for the target application of the client device according to the corresponding application resource configuration strategy, so as to meet application requirements of the client device and improve application experiences of the user. Whether the fixed routing resources can meet a peak load of the target application is test through the peak load test data, so as to ensure that the fixed routing resources can fully satisfy the use of the target application. When the target application is shutdown, the client device transmits the application stop notification to the WIFI6 router, and the WIFI6 router disbands the task queue to release the fixed routing resources, so that the task queue is created when the target application is started, and the task queue is disbanded when the target application is shutdown, the fixed routing resources are configured according to the target application, thereby meeting the application requirements, the delay and packet loss of the data of the target application can be effectively reduced, the transmission speed requirement of the data of the target application can be met, and better application experiences can be provided to the user. Compared with existing Qos (Quality Of Service) for client devices, the present disclosure can provide the users better application experiences by allocating the fixed routing resources for the target application.

BRIEF DESCRIPTION OF THE DRAWINGS

The accompanying drawings, which are incorporated in and constitute a part of this specification, illustrate the embodiments of the present disclosure, and together with the specification to explain the principles of the present disclosure.

For describing the technical solutions of the present disclosure clearly, the following will briefly introduce the accompanying drawings used in the present disclosure, obviously, for those of ordinary skill in the art, on the premise of not paying creative efforts, additional drawings can be derived from these drawings.

DETAILED DESCRIPTION

In order to make the purpose, technical solutions, and advantages of the embodiments of the present disclosure clear, the technical solutions in the embodiments of the present disclosure will be clearly and completely described below, in conjunction with the drawings in the embodiments of the present disclosure. Obviously, the described embodiments are some of the embodiments of the present disclosure, not all of the embodiments. Based on the embodiments in the present disclosure, all other embodiments obtained by those of ordinary skill in the art without making creative efforts fall within the protection scope of the present disclosure.

Figure 1:
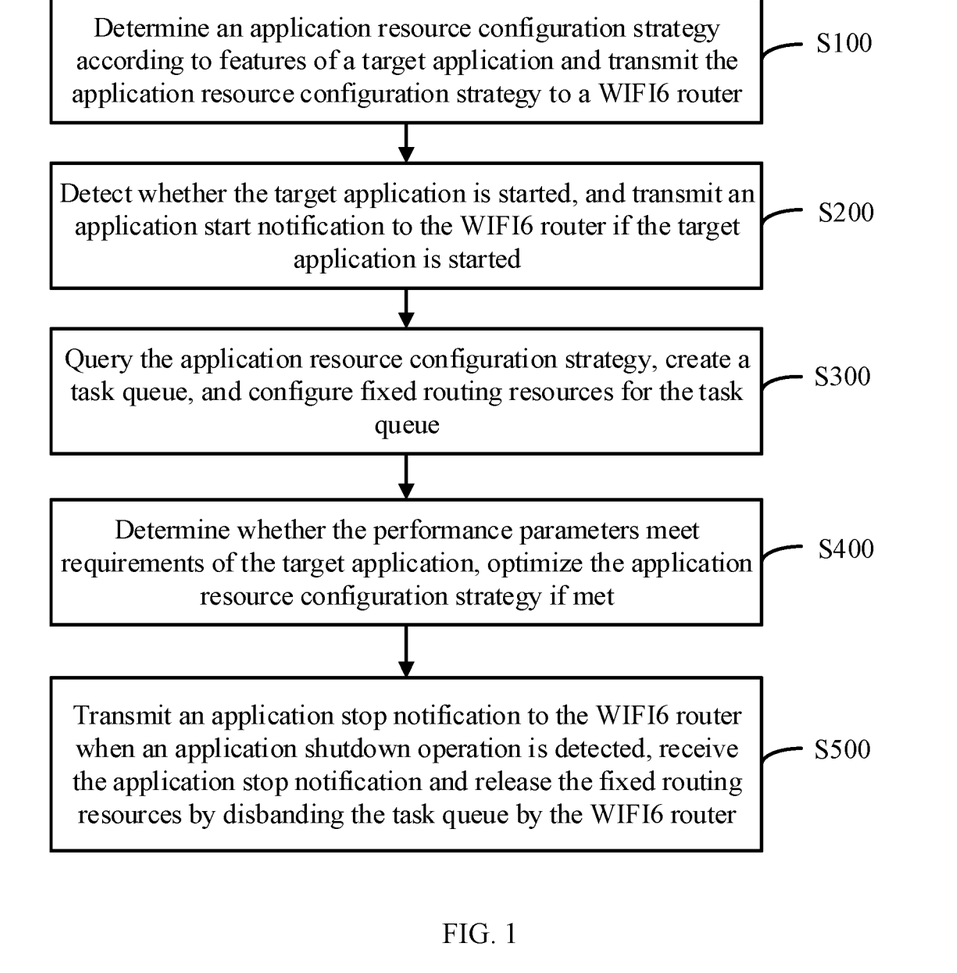
FIG. 1 is a flowchart of a method for allocating routing resources of a WIFI6 router according to one embodiment of the present disclosure.
Figure 2:
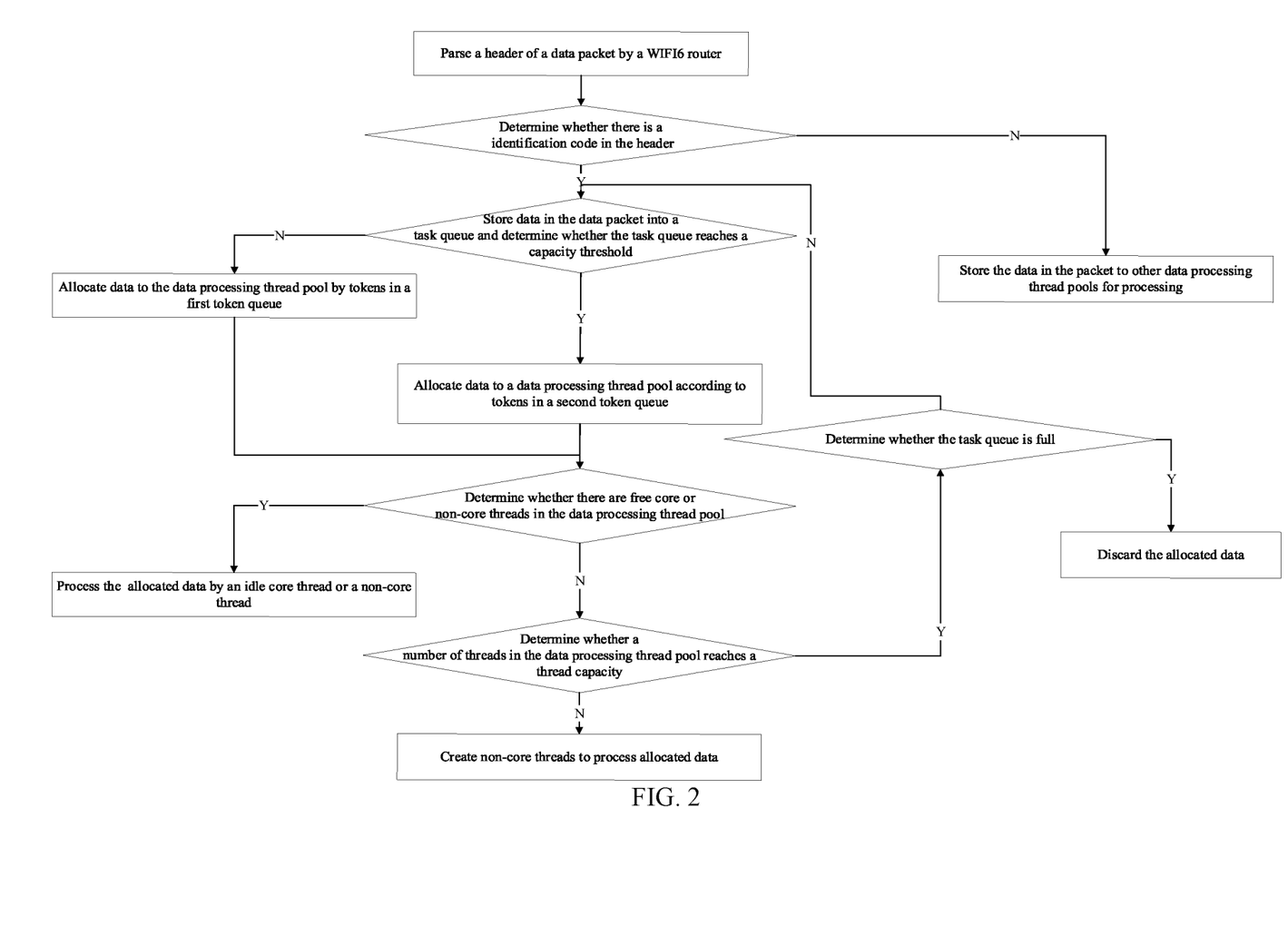
FIG. 2 is a work flowchart of a task queue and a data processing thread pool according to one embodiment of the present disclosure.
Figure 3:
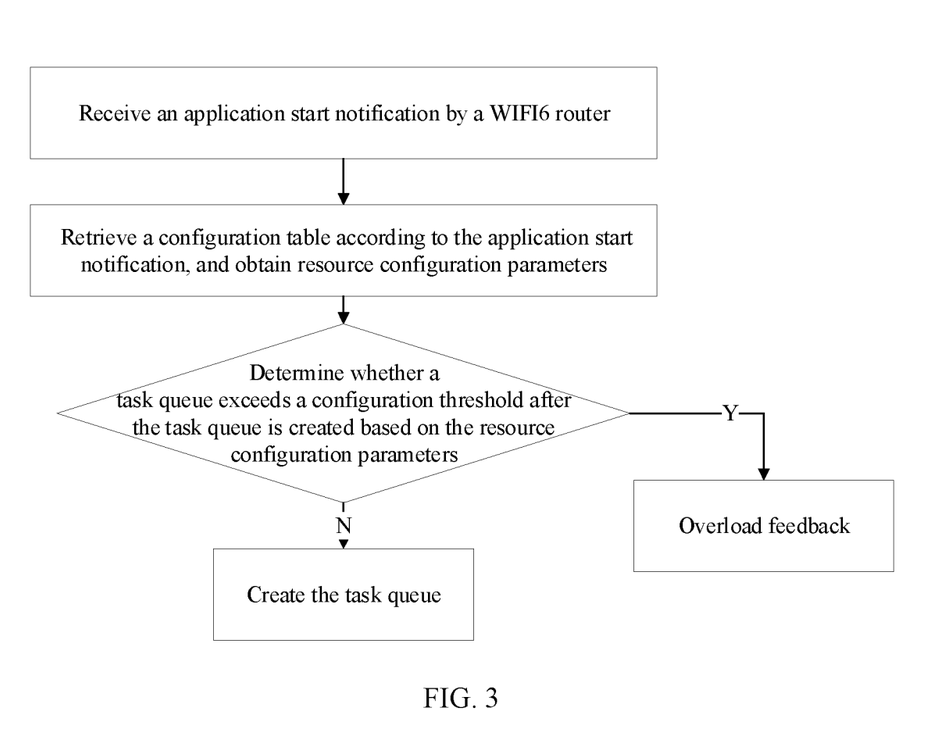
FIG. 3 is a flowchart of determining whether an application resource configuration strategy is executed based on a configuration threshold according to one embodiment of the present disclosure.
Figure 4:
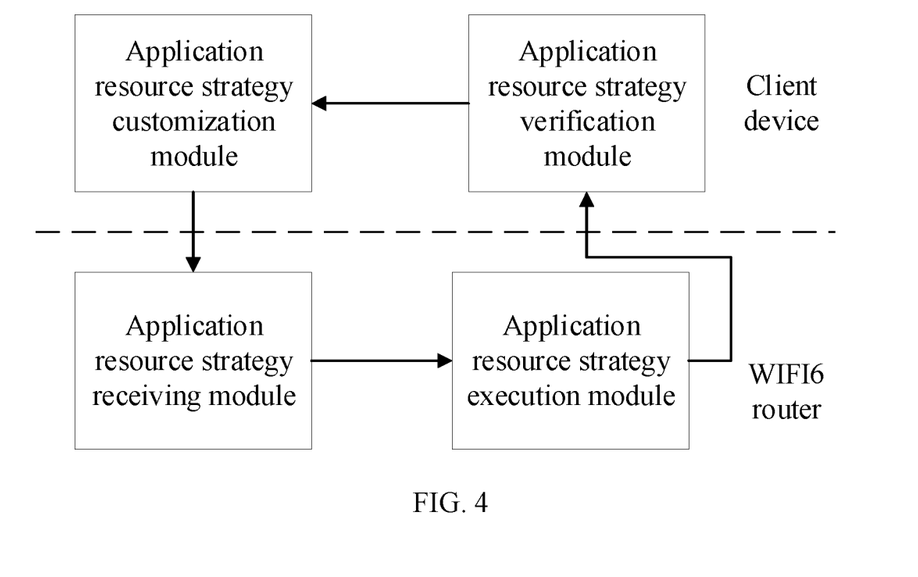
FIG. 4 is a schematic diagram of an electronic device for allocating routing resources of WIFI6 router according to one embodiment of the present disclosure.

FIG. 1 is a flowchart of a method for allocating routing resources of WIFI6 router according to one embodiment of the present disclosure. FIG. 2 is a work flowchart of a task queue and a data processing thread pool according to one embodiment of the present disclosure. FIG. 3 is a flowchart of determining whether an application resource configuration strategy is execute based on a configuration threshold according to one embodiment of the present disclosure. FIG. 4 is a schematic diagram of an electronic device for allocating routing resources of a WIFI6 router according to one embodiment of the present disclosure.

Referring to FIG. 1, the method for allocating routing resources of a WIFI6 router includes following steps.

S100: determining an application resource configuration strategy according to features of a target application and transmitting the application resource configuration strategy to the WIFI6 router by a client device;

S200: detecting whether the target application is started, and if the target application is started, transmitting an application start notification to the WIFI6 router;

S300: querying the application resource configuration strategy according to the application start notification, creating a task queue, and configuring fixed routing resources for the task queue by the WIFI6 router.

S400: transmitting and receiving peak load test data through the WIFI6 router by the client device, obtaining performance parameters for executing the peak load test data from the WIFI6 router; determining whether the performance parameters meet requirements of the application resource configuration strategy, if the performance parameters meet the requirements of the application resource configuration strategy, executing the application resource configuration strategy according to the task queue and the fixed routing resources; if the performance parameters do not meet the requirements of the application resource configuration strategy, providing optimized parameters according to differences between the performance parameters and the requirements of the application resource configuration strategy, and optimizing the task queue and the fixed routing resources by the optimized parameters until the requirements of the application resource configuration strategy is met.

S500, transmitting an application stop notification to the WIFI6 router when an application shutdown operation is detected; receiving the application stop notification and releasing the fixed routing resources by disbanding the task queue by the WIFI6 router.

According to the features (e.g., an application bandwidth requirement, a data transmission speed requirement, a delay requirement, and a packet loss rate requirement) of the target application of the client device, the application resource configuration strategy is determined and transmitted to the WIFI6 router. In some embodiments, the client device comprises an application resource strategy customization module. The application resource strategy customization module traverses applications installed in the client device and obtains the applications, and the application resource strategy customization module further provides an application resource strategy customization interface including application options and application resource parameter options for a user. The application resource strategy customization module further receives application resource parameters configured by the user for the target application through the application resource strategy customization interface, so as to meet the bandwidth requirement, the data transmission speed requirement, the delay requirement, and the packet loss rate requirement of the target application.

In some embodiments, the WIFI6 router comprises a configuration table storing application resource configuration strategies of all applications, and the configuration table records a MAC (Media Access Control) and an IP (Internet Protocol) of the client device where the applications are installed, an application ID of each of the applications, and related resource configuration parameters of each of the applications. In a specific implementation process, the MAC, the IP, the application ID of each of the applications, and the related resource configuration parameters of each of the applications are added in the configuration table by adding the application resource configuration strategy information in the application resource strategy customization interface. The MAC, the IP, the application ID of each of the applications, and the related resource configuration parameters of each of the applications are deleted in the configuration table by deleting the application resource configuration strategy information in the application resource strategy customization interface. The MAC, the IP, the application ID of each of the applications, and the related resource configuration parameters of each of the applications are replaced in the configuration table by replacing the application resource configuration strategy information in the application resource strategy customization interface, In some embodiments, the application resource strategy customization module in the client device monitors startup statuses and shutdown statuses of the applications in the client device. When the target application configured with the application resource configuration strategy is started, the application resource strategy customization module transmits the application start notification to the WIFI6 router. A data packet of the application start notification includes the MAC and the IP of the client device where the target application is installed and a target application ID.

In some embodiments, the WIFI6 router retrieves the configuration table according to the MAC, the IP, and the target application ID, and obtains the related resource configuration parameters of the target application. The WIFI6 router further creates two hash slots for generating tokens according to the resource configuration parameters of the target application. A token generation rate of the hash slots is determined according to the resource configuration parameters of the target application. A first one of the hash slots generates the tokens according to an average rate of data of the target application and stores the tokens in a first token queue, and a second one of the hash slots generates the tokens according to a peak rate of the data of the target application and stores the tokens in a second token queue. The WIFI6 router further creates the task queue with a certain capacity according to the resource configuration parameters of the target application, obtains the tokens from the first token queue and the second token queue, extracts the data packet from the task queue according to the tokens, and transmits the data packet to the fixed routing resources. The data packet is processed and forwarded by the fixed routing resources. Thus, the target application is assigned with a fixed data packet allocation speed less than a generation rate of the tokens in the second token queue, thereby meeting a data transmission requirement of the target application. When the tokens in the first token queue are not enough, the tokens in the second token queue are only used. In order to ensure that a data processing speed of the data matches the fixed data packet allocation speed and avoid a high packet loss rate, a data processing thread pool is configured for the task queue, and a thread capacity of the data processing thread pool is determined according to the application resource configuration strategy. The thread capacity is a total number of core threads and non-core threads that are allowed to be accommodated in the data processing thread pool. The number of the core threads is determined according to the application resource allocation strategy of the target application, and the core threads and the non-core threads are able to call a packet transmitting function to process the data in the task queue.

The client device adds an identification code corresponding to the target application ID to a header of the data packet of the target application. In some embodiments, the identification code is determined in a user-defined field of the header of the data packet, and the WIFI6 router adds a parse instruction for the identification code of the user-defined field. The WIFI6 route further parses the header of the data packet and obtains the MAC, the IP, and the identification code, and adds the data packet to the task queue according to the MAC, the IP, and the identification code. A capacity threshold of the task queue is determined according to the application resource configuration strategy.

Referring to FIG. 2, in some embodiments, when there is the data in the task queue, it is determined whether the data in the task queue reaches the capacity threshold. If it is determined that the data in the task queue does not reach the capacity threshold, the data is allocated to the data processing thread pool according to the tokens in the first token queue, and if it is determined that the data in the task queue reaches the capacity threshold, the data is allocated to the data processing thread pool according to the tokens in the second token queue. It is further determined that whether there are idle threads in the data processing thread pool, where the idle threads include the core threads and the non-core threads, and the core threads of the idle threads are preferentially used. If it is determined that there are idle threads in the data processing thread pool, allocated data is processed by the idle threads. If there is no idle thread in the data processing thread pool, it is determined whether the number of threads in the data processing thread pool reaches the thread capacity. If it is determined that the number of threads in the data processing thread pool does not reach the thread capacity, the non-core threads are created to process the allocated data. If the number of threads in the data processing thread pool reaches the thread capacity, it is determined whether the task queue is full. If it is determined that the task queue is not full, the allocated data is restored to the task queue. If it is determined that the task queue is full, the allocated data is discarded. Basic data processing of the target application is guaranteed through fixed core threads, and the data processing requirements of an application data processing peak are guaranteed by creating the non-core threads to crawl the routing resources of the WIFI6 router, so as to ensure that WIFI6 router provides specific services for the target application, and thereby further ensuring the user experiences of the target application.

In some embodiments, whether the routing resources meet the requirements of the target application is test by transmitting the peak load test data by the target application, if the routing resources do not meet the requirements of the target application, the application resource configuration strategy is optimized. The routing resources include data processing thread resources for the data packet in the task queue, and the data processing thread resources preferentially process the data in the task queue. The data processing thread pool is configured for the task queue, and the data processing thread pool is configured with a certain number of the core threads and the non-core threads. The core threads permanently exist in the data processing thread pool for processing the data in the task queue. The non-core threads are temporarily created for processing the data in the task queue, and the non-core threads are destroyed if an idle time of the non-core threads exceeds a predetermined time threshold, so as to avoid occupation of the routing resources when there is no need to use the non-core threads.

In some embodiments, the performance parameters of the WIFI6 router for executing the peak load test data are obtained by capturing packets. The performance parameters include a data transmission rate, a delay rate, and a packet loss rate. The optimized parameters based on the performance parameters include a change rate of each of the hash slots (e.g., the change rate of each of the hash slots is increased when the data transmission rate is not large enough to improve the generation rate of the tokens), an optimization of a channel bandwidth (e.g., for ensuring that the WIFI6 router provides stable bandwidth for the client device), an optimization of a task queue capacity (e.g., the task queue capacity is increased to avoid packet loss), an optimization of the thread capacity (i.e., to increase a data processing capacity) of the data processing thread pool, an optimization of the number of the core threads (i.e., to increase a fixed allocated data processing capacity) in the data processing thread pool, an optimization of the capacity threshold (when the data in the task queue reaches the capacity threshold, it is indicated that a token generation speed of the first token queue is insufficient relative to the data transmission speed, and data accumulation leads to increasement of delay of data transmission, the tokens in the second token queue is called in time by optimizing the capacity threshold, and the routing resources are crawled by creating the non-core threads, thereby meeting the allocation speed of tokens in the second token queue), and an optimization of the time threshold of the non-core threads (i.e., properly increasing the time threshold of non-core threads is able to reduce recreation of the non-core threads).

In some embodiments, when the application resource strategy customization module monitors that the user stops the target application, the application resource strategy customization module transmits the application stop notification to the WIFI6 router. The data packet of the application stop notification includes the MAC and the IP of the client device where the target application is installed and the target application ID. The WIFI6 router receives the application stop notification, and the WIFI6 router determines and disbands the task queue according to the application stop notification, and releases the routing resources occupied by the threads in the data processing thread pool.

Referring to FIG. 3, in some embodiments, a configuration threshold of the task queue is determined according to the thread capability of the WIFI6 router, thereby preventing the WIFI6 router from occupying too many routing resources and affecting other services due to excessive configuration of the application resource configuration strategy. In some implementations, if the task queue of the target application exceeds the configuration threshold, the WIFI6 router transmits overload feedback to the application resource configuration module and refuses to execute the application resource configuration strategy.

The present disclosure further provides an electronic device for allocating routing resources of WIFI6 router. The electronic device includes the client device. The client device comprises the application resource strategy customization module and the application resource strategy verification module. The application resource strategy customization module detects the applications installed in the client device, provides the application resource configuration strategy configuration interface for the user to help the user complete formulation of the application resource configuration strategy, detects the startup statuses and the shutdown statuses of the applications of the client device, and transmits the application start notification and application stop notification to the WIFI6 router. The application resource strategy verification module obtains the performance parameters of the peak load test data when the application resource configuration strategy is executed by capturing the packets, and determines whether the application resource configuration strategy is qualified according to whether the performance parameters meet the standards. If the performance parameters do not meet the requirements of the application resource configuration strategy, the task queue and the fixed routing resources are optimized by providing the optimized parameters according to the differences between the performance parameters and the requirements of the application resource configuration strategy, until the performance parameters meet the requirements of the application resource configuration strategy.

The electronic device further includes the WIFI6 router connected to the client device, the WIFI6 router comprises an application resource strategy receiving module and an application resource strategy execution module. The application resource strategy receiving module receives the application resource configuration strategy, the application stop notification, and the application start notification. The application resource strategy execution module creates or disbands the task queue and the data processing thread pool according to the application resource configuration strategy, the application stop notification, and the application start notification.

According to the method provided by the embodiments of the present disclosure, when the client device runs the target application with the application resource configuration strategy, the client device transmits the application start notification to the WIFI6 router, and the WIFI6 router allocates the fixed routing resources for the target application of the client device according to the corresponding application resource configuration strategy, so as to meet application requirements of the client device and improve application experiences of the user. Whether the fixed routing resources can meet a peak load of the target application is test through the peak load test data, so as to ensure that the fixed routing resources can fully satisfy the use of the target application. When the target application is shutdown, the client device transmits the application stop notification to the WIFI6 router, and the WIFI6 router disbands the task queue to release the fixed routing resources, so that the task queue is created when the target application is started, and the task queue is disbanded when the target application is shutdown, the fixed routing resources are configured according to the target application, thereby meeting the application requirements, the delay and packet loss of the data of the target application can be effectively reduced, the transmission speed requirement of the data of the target application can be met, and better application experiences can be provided to the user. Compared with existing Qos (Quality Of Service) for client devices, the present disclosure can provide the users better application experiences by allocating the fixed routing resources for the target application.

It should be noted that, relative terms such as "first" and "second" are only used to distinguish one entity or operation from another entity or operation, and do not necessarily require or imply any actual relationship or order exists between entities or operations. Furthermore, the term "includes", "comprises" or any other variation thereof is intended to cover a non-exclusive inclusion such that a process, method, article, or apparatus comprising a set of elements includes not only those elements, but also includes other elements not expressly listed, or also include elements inherent in such a process, method, article, or device. Without further limitations, an element defined by the phrase "includes a . . . " does not exclude the presence of additional identical elements in the process, method, article or apparatus including other same elements.

The above descriptions are only specific implementation manners of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to conform to the widest scope consistent with the principles and novel features disclosed herein.

What is claimed is:

1. A method for allocating routing resources of a WIFI6 router, comprising:
   determining an application resource configuration strategy according to features of a target application and transmitting the application resource configuration strategy to the WIFI6 router by a client device;
   transmitting an application start notification to the WIFI6 router;
   querying the application resource configuration strategy according to the application start notification, creating a task queue, and configuring fixed routing resources for the task queue by the WIFI6 router;
   transmitting and receiving peak load test data through the WIFI6 router by the client device, obtaining performance parameters for executing the peak load test data from the WIFI6 router; determining whether the performance parameters meet requirements of the application resource configuration strategy; in response that the performance parameters meet the requirements of the application resource configuration strategy, executing the application resource configuration strategy according to the task queue and the fixed routing resources; in response that the performance parameters do not meet the requirements of the application resource configuration strategy, providing optimized parameters according to differences between the performance parameters and the requirements of the application resource configuration strategy, and optimizing the task queue and the fixed routing resources by the optimized parameters until the requirements of the application resource configuration strategy is met; and
   transmitting an application stop notification to the WIFI6 router by the client device when an application deactivation operation is detected, receiving the application stop notification and releasing the fixed routing resources by disbanding the task queue by the WIFI6 router.

2. The method according to claim 1, wherein the WIFI6 router comprises a configuration table storing the application resource configuration strategy, and the configuration table records a MAC and an IP of the client device where the target application is installed, a target application ID of the application, and related resource configuration parameters; the application start notification comprises the MAC, the IP, and the target application ID of the client device where the target application is installed, the WIFI6 router creates the task queue by retrieving the configuration table according to the application start notification and obtaining related resource configuration parameters.

3. The method according to claim 2, wherein the method further comprising:
   adding an identification code corresponding to the target application ID to a header of a data packet of the target application; and
   parsing the header of the data packet, obtaining the MAC, the IP, and the identification code, and adding the data packet to the task queue according to the MAC, the IP, and the identification code by the WIFI6 router.

4. The method according to claim 3, wherein the method further comprising:
   creating two hash slots for generating tokens, wherein a token generation rate of the hash slots is determined according to the resource configuration parameters, a first one of the hash slots generates the tokens according to an average rate of data of the target application and stores the tokens in a first token queue, and a second one of the hash slots generates the tokens according to a peak rate of the data of the target application and stores the tokens in a second token queue;
   creating the task queue corresponding to the application, and transmitting data related to the target application to the task queue according to the identification code by the WIFI6 router; and obtaining the tokens from the first token queue and the second token queue, extracting the data related to the target application from the task queue according to the tokens, and transmitting the data related to the target application to the fixed routing resources; processing and forwarding the data related to the target application by the fixed routing resources.

5. The method according to claim 1, wherein the fixed routing resources comprise data processing thread resources for data in the task queue, the data processing thread resources call a packet transmitting function to process the data in the task queue.

6. The method according to claim 5, wherein the method further comprises:
configuring a data processing thread pool for the task queue, wherein the data processing thread pool comprises core threads and non-core threads, the core threads permanently exist in the data processing thread pool for processing the data in the task queue, the non-core threads are temporarily created for processing the data in the task queue, and the non-core threads are destroyed in response that an idle time of the non-core threads exceeds a predetermined time threshold.

7. The method according to claim 1, wherein a step of obtaining the performance parameters for executing the peak load test data comprises:
obtaining the performance parameters for executing the peak load test data by capturing packets, wherein the performance parameters comprise a data transmission rate, a delay rate, and a packet loss rate.

8. The method according to claim 7, wherein the optimized parameters comprise a change rate of each of the hash slots, an optimization of a task queue capacity, an optimization of a thread capacity of the data processing thread pool, an optimization of a number of the core threads in the data processing thread pool, an optimization of a capacity threshold, and an optimization of a time threshold of the non-core threads.

9. The method according to claim 6, wherein a configuration threshold of the task queue is determined according to a thread capability of the WIFI6 router.

10. An electronic device for allocating routing resources of a WIFI6 router, comprising:
a client device configured with at least one client instruction, and the at least one client instruction is executed to cause the client device to provide an application resource configuration strategy customization interface for determining and optimizing an application resource configuration strategy, detecting startup statuses of a target application, and transmitting an application start notification and an application stop notification; and
a WIFI6 router configured with at least one routing instruction, and the at least one routing instruction is configured to execute a method for allocating routing resources of the WIFI6 router according to claim 1.

* * * * *